(12) United States Patent
Imai

(10) Patent No.: US 9,755,533 B2
(45) Date of Patent: Sep. 5, 2017

(54) RESONANT INVERTER AND RESONANT POWER SOURCE UNIT

(71) Applicant: TDK CORPORATION, Tokyo (JP)

(72) Inventor: Katsunori Imai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/153,092

(22) Filed: May 12, 2016

(65) Prior Publication Data

US 2016/0352235 A1    Dec. 1, 2016

(30) Foreign Application Priority Data

May 12, 2015  (JP) .................................. 2015-096989

(51) Int. Cl.
*H02M 3/335*  (2006.01)
*H02M 1/00*  (2006.01)

(52) U.S. Cl.
CPC ........ *H02M 3/33569* (2013.01); *H02M 3/335* (2013.01); *H02M 2001/0058* (2013.01); *Y02B 70/1433* (2013.01)

(58) Field of Classification Search
CPC .................................................... H02M 7/537
See application file for complete search history.

(56) References Cited

U.S. PATENT DOCUMENTS

| | | | |
|---|---|---|---|
| 7,889,519 B2 | 2/2011 | Perreault et al. | |
| 7,924,580 B2 | 4/2011 | Glaser et al. | |
| 8,040,697 B2 * | 10/2011 | Zhou | H02M 3/337 363/17 |
| 8,138,682 B2 * | 3/2012 | Godyak | H05B 41/24 315/219 |
| 9,276,413 B1 * | 3/2016 | Zhang | H02J 50/12 |
| 2015/0140937 A1 * | 5/2015 | Story | H04B 1/44 455/78 |
| 2016/0329828 A1 * | 11/2016 | Zhang | H02M 1/08 |

OTHER PUBLICATIONS

Sekiya, Hiroo et al., "Effect of Nonlinear Output Capacitance in Class DE Amplifier," The Institute of Electronics, Information and Communication Engineers, vol. 107, No. 330, (2007), pp. 51-56.

* cited by examiner

*Primary Examiner* — Emily P Pham
(74) *Attorney, Agent, or Firm* — Oliff PLC

(57) ABSTRACT

A resonant inverter is provided that includes a first switch and a second switch alternately turned on and off, a first inverter including the first switch and a first resonant circuit including a first coil and a first capacitor, and a second inverter including the second switch and a second resonant circuit including a second coil and a second capacitor. The first coil, the second coil, and a third capacitor constitute a third resonant circuit.

22 Claims, 6 Drawing Sheets

RESONANT INVERTER AND RESONANT POWER SOURCE UNIT

BACKGROUND OF THE INVENTION

1. Field of the Invention

The present invention relates to a resonant inverter and a resonant power source unit that easily lower an operating voltage of a switch.

2. Description of the Related Art

U.S. Pat. No. 7,889,519 discloses an isolated resonant converter. The isolated resonant converter includes an isolation transformer provided on the side of a resonant rectifier, to isolate the output of a resonant inverter to be supplied to a load. In addition, U.S. Pat. No. 7,924,580 discloses a non-isolated resonant converter. The non-isolated resonant converter includes two switches having a phase difference of 180 degrees that are alternately turned on and off when supplying power to a load. Employing the resonant converter techniques disclosed in the cited documents enables provision of a resonant converter capable of supplying a large power with a low switch voltage. Further, U.S. Pat. No. 7,889,519 and U.S. Pat. No. 7,924,580 both teach that the switch voltage can be lowered by making the drain-source impedance of the switch highest at a driving frequency and 3 times thereof, and lowest at approximately twice of the driving frequency. Still further, IEICE Technical Report EE Vol. 107 (330), 2007, pp. 51 to 56 discloses a method of optimizing the drain-source capacitance of a switch when supplying power to a load resistance in a Class DE converter.

The resonant inverters disclosed in the cited documents include two single-end inverters coupled to each other, and are naturally capable of handling a power twice as large as the power that can be handled by a single-end inverter. In general, in addition, it is difficult to drive a high-side switch, for example used in a bridge circuit, at a high frequency in a high frequency inverter from the viewpoint of prevention of through current between the high-side switch and a low-side switch, because a dead time has to be surely suppressed to a short period. In contrast, the resonant inverter disclosed above only drives the low-side switch, and is therefore advantageous for expanding the power range of the inverter driven at a high frequency.

In the case of constituting the resonant inverter by the method according to the IEICE Technical Report, however, the switch operating voltage may become too high when the load resistance is determined first and then the drain-source capacitance is determined, because when the load resistance is high the drain-source capacitance becomes smaller. This is because when the drain-source capacitance is made larger to lower the switch operating voltage and the resonators are set up on the basis of the drain-source capacitance, resultantly the load resistance that realizes an optimal operation is lowered and, consequently, deviated from the optimal operation point when the resistance is high. Accordingly, a solution has to be provided to how to lower the switch operating voltage without affecting the drain-source capacitance of the switch, when the drain-source capacitance of the switch is determined on the basis of the load resistance.

The present invention has been accomplished in view of the drawbacks incidental to the conventional technique, and provides a resonant inverter and a resonant power source unit capable of lowering the switch operating voltage irrespective of the load resistance, and reducing the size and manufacturing cost of the apparatus.

SUMMARY OF THE INVENTION

In an aspect, the present invention provides a resonant inverter including a first switch and a second switch alternately turned on and off, a first inverter including the first switch and a first resonant circuit including a first coil and a first capacitor, and a second inverter including the second switch and a second resonant circuit including a second coil and a second capacitor, and the first coil, the second coil, and a third capacitor constitute a third resonant circuit. Such a configuration enables drain-source impedance to be lowered at a resonance frequency determined when the switch is off, thereby enabling a switch operating voltage to be lowered.

In the resonant inverter configured as above, the first capacitor may be connected in parallel to the first switch, the second capacitor may be connected in parallel to the second switch. The first coil may be provided between the first switch and a first input terminal, the second coil may be provided between the second switch and the first input terminal, and the third capacitor may be provided between the first switch and the second switch, and connected in parallel to the first coil and the second coil connected in series to each other. Such a configuration enables the switch operating voltage to be lowered.

The resonant inverter configured as above may further include a fourth capacitor and a third coil provided between the first switch and the second switch and constituting a fourth resonant circuit. Such a configuration enables the switch operating voltage to be lowered, and contributes to reduction in size and manufacturing cost of the apparatus, because the fourth resonant circuit can be shared by the first inverter and the second inverter.

The resonant inverter configured as above may further include a fifth resonant circuit including a fifth coil provided parallel to the first switch and a fifth capacitor, the fifth coil and the fifth capacitor being connected in series, and a sixth resonant circuit including a sixth coil provided parallel to the second switch and a sixth capacitor, the sixth coil and the sixth capacitor being connected in series. Such a configuration enables the switch operating voltage to be lowered.

In another aspect, the present invention provides a resonant inverter including a first switch and a second switch alternately turned on and off, a transformer including a first winding and a second winding on a primary side, a first inverter including the first switch and a first resonant circuit including a first coil and a first capacitor, and a second inverter including the second switch and a second resonant circuit including a second coil and a second capacitor, and the first coil, the second coil, and a third capacitor constitute a third resonant circuit. Such a configuration enables the switch operating voltage to be lowered, even when the transformer is incorporated.

In the resonant inverter configured as above, the first capacitor may be connected in parallel to the first switch, the second capacitor may be connected in parallel to the second switch. The first coil may be first coil may be connected to the first switch and one end of the first winding of the transformer, the second coil may be connected to the second switch and one end of the second winding of the transformer, and the third capacitor may be provided between the first switch and the second switch. Such a configuration enables the switch operating voltage to be lowered.

The resonant inverter configured as above may further include a fourth capacitor and a third coil provided between the first switch and the second switch, and constituting a fourth resonant circuit. Such a configuration enables the switch operating voltage to be lowered, and contributes to reduction in size and manufacturing cost of the apparatus, because the fourth resonant circuit can be shared by the first inverter and the second inverter.

The resonant inverter configured as above may further include a fifth resonant circuit including a fifth coil provided parallel to the first switch and a fifth capacitor, the fifth coil and the fifth capacitor being connected in series, and a sixth resonant circuit including a sixth coil provided parallel to the second switch and a sixth capacitor, the sixth coil and the sixth capacitor being connected in series. Such a configuration enables the switch operating voltage to be lowered.

The resonant inverter configured as above, may further include a seventh resonant circuit including the first coil, the second coil, the first winding of the transformer, the second winding of the transformer, and the third capacitor. Such a configuration enables the switch operating voltage to be lowered.

In the resonant inverter configured as above, the first coil and the second coil may be constituted of leakage inductance of the transformer. Such a configuration enables the switch operating voltage to be lowered, and contributes to reduction in size and manufacturing cost of the apparatus, because the coils constituting the first resonant circuit and the seventh resonant circuit can be excluded.

In the resonant inverter configured as above, a center tap provided between the first winding and the second winding of the transformer may be connected to an input terminal to which an input voltage is applied. Such a configuration enables the switch operating voltage to be lowered, and facilitates adjustment of the output voltage because the turns ratio of the transformer can be determined without depending on a rectifier on the secondary side.

In the resonant inverter configured as above, a capacitance Cf of the third capacitor may satisfy Equation (1), where Lf denotes inductance of the first coil and the second coil, and Fs denotes a driving frequency of the switch:

$$\frac{1}{4\pi^2 2L_f (2F_s)^2} \leq C_f \leq \frac{1}{4\pi^2 2L_f (3F_s)^2} \quad (1)$$

Such a configuration enables the switch operating voltage to be lowered.

In the resonant inverter configured as above, the first capacitor, the second capacitor, and the third capacitor may be a variable capacitor. In this case, for example, the capacitance of the first capacitor and the second capacitor can be adjusted so as to decrease the higher the load resistance is, and to increase the lower the load resistance is, and the capacitance of the fifth capacitor Cf can be adjusted so as to increase the higher the load resistance is, and to decrease the lower the load resistance is. Such a configuration enables the switch operating voltage to be lowered, even when the load resistance varies.

Thus, the present invention provides a resonant inverter and a resonant power source unit capable of lowering the switch operating voltage irrespective of the load resistance, and reducing the size and manufacturing cost of the apparatus.

DESCRIPTION OF THE PREFERRED EMBODIMENTS

Figure 1:
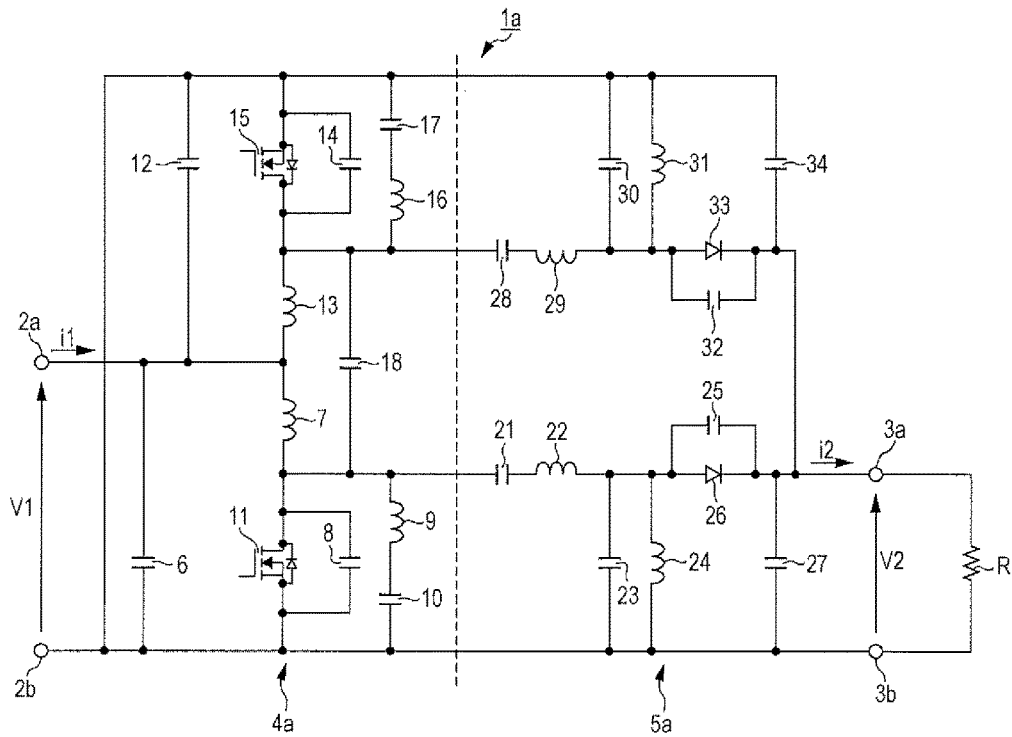
FIG. 1 is a circuit diagram of a resonant inverter and a resonant converter (resonant power source unit) according to a first embodiment of the present invention.

Hereafter, exemplary embodiments of the present invention will be described. However, the present invention is not limited to the embodiments described hereunder. The constituents referred to hereunder may include those that can be easily reached by persons skilled in the art, or constituents substantially the same as those, and such constituents may be combined as desired.

The embodiments of the present invention will be described in details with reference to the drawings. In the drawings the same constituents will be given the same numeral, and the description thereof will not be repeated.

Embodiment 1

FIG. 1 is a circuit diagram of a resonant converter 1a (resonant power source unit) according to a first embodiment of the present invention. The resonant converter 1a shown in FIG. 1 includes a pair of input terminals, namely a first input terminal 2a and a second input terminal 2b (or simply input terminal 2 when distinction is unnecessary), a pair of output terminals, namely a first output terminal 3a and a second output terminal 3b (or simply output terminal 3 when distinction is unnecessary), a resonant inverter 4a, and a resonant rectifier 5a, and converts an input voltage (DC voltage) V1 inputted to the input terminal 2 into an output voltage (DC voltage) V2, and outputs the voltage V2 from the output terminal 3. The resonant converter 1a receives the input voltage V1 and an input current i1 at the input terminal 2, and outputs the output voltage V2 and a load current i2 from the output terminal 3.

The resonant inverter 4a includes a switch and an input capacitor in each inverter circuit. The switch refers to a switch 11 (first switch) and a switch 15 (second switch), and the input capacitor refers to an input capacitor 6 and an input capacitor 12 in FIG. 1. The resonant inverter 4a also includes a first coil 7, a second coil 13, a first capacitor 8, a second capacitor 14 and, further, a fifth coil 9, a fifth capacitor 10, a sixth coil 16, and a sixth capacitor 17. The resonant converter 1a herein exemplified represents a resonant buck converter circuit, which converts the input voltage V1 received through the input terminal 2 into an AC voltage.

The inverter circuits herein referred to are a first inverter circuit including the input capacitor 6, the switch 11, the first capacitor 8, the first coil 7, the fifth capacitor 10, and the fifth coil 9, and a second inverter circuit including the input capacitor 12, the switch 15, the second capacitor 14, the second coil 13, the sixth capacitor 17, and the sixth coil 16. The first switch 11 and the second switch 15 are alternately turned on and off at the same frequency and with a phase difference of 180 degrees.

The first input terminal 2a is connected to one end of the input capacitor 6 and one end of the first coil 7. The other end of the first coil 7 is connected to the drain of the first switch 11, one end of the first capacitor 8, and one end of the fifth coil 9. The source of the first switch 11 is connected to the other end of the first capacitor 8, the other end of the input capacitor 6, one end of the fifth capacitor 10, and the input terminal 2b. The other end of the fifth coil 9 is connected to the other end of the fifth capacitor 10. Accordingly, the first switch 11 and the first capacitor 8 are connected in parallel, and the series connection of the fifth coil 9 and the fifth capacitor 10 are connected in parallel to the first switch 11 and the first capacitor 8. The first switch 11 includes a body diode, the cathode of which is connected to the drain of the first switch 11, and the anode of which is connected to the source of the first switch 11. The gate of the first switch 11 is connected to a non-illustrated control circuit.

The input terminal 2a is also connected to one end of the input capacitor 12 and one end of the second coil 13. The other end of the second coil is connected to the drain of the second switch 15, one end of the second capacitor 14, and one end of the sixth coil 16. The source of the second switch 15 is connected to the other end of the second capacitor 14, the other end of the input capacitor 12, one end of the fifth capacitor 17, and the input terminal 2b. The other end of the sixth coil 16 is connected to the other end of the sixth capacitor 17. Accordingly, the second switch 15 and the second capacitor 14 are connected in parallel, and the series connection of the sixth coil 16 and the sixth capacitor 17 is connected in parallel to the second switch 15 and the second capacitor 14. The second switch 15 includes a body diode, the cathode of which is connected to the drain of the second switch 15, and the anode of which is connected to the source of the second switch 15. The gate of the second switch 15 is connected to a non-illustrated control circuit.

The third capacitor 18 is inserted so as to span between the first inverter circuit and the second inverter circuit, and connected between the respective drain terminals of the first switch 11 and the second switch 15 and connected in parallel to the series connection of the first coil 7 and the second coil 13.

The first coil 7 and the first capacitor 8 constitute a first resonant circuit, and the second coil 13 and the second capacitor 14 constitute a second resonant circuit. One end of the fifth coil 9 and one end of the fifth capacitor 10 are connected in series to each other. The other end of the fifth coil 9 is connected to one end of the first coil 7, the drain of the first switch 11, and one end of the first capacitor 8. The other end of the fifth capacitor 10 is connected to the source of the first switch 11, the other end of the first capacitor 8, and the input terminal 2b. Likewise, one end of the sixth coil 16 and one end of the sixth capacitor 17 are connected in series to each other. The other end of the sixth coil 16 is connected to one end of the second coil 13, the drain of the second switch 15, and one end of the second capacitor 14. The other end of the sixth capacitor 17 is connected to the source of the second switch 15, the other end of the second capacitor 14, and the input terminal 2b. The fifth coil 9 and the fifth capacitor 10 constitute a fifth resonant circuit, and the sixth coil 16 and the sixth capacitor 17 constitute a sixth resonant circuit. In addition, between the respective drain terminals of the first switch 11 and the second switch 15, the third capacitor 18 is provided. The third capacitor 18, the first coil 7, and the second coil 13 constitute a third resonant circuit.

In the mentioned configuration, although the switches 11, 15 each include a reverse conducting diode for conduction from the input terminal 2b toward the input terminal 2a, and an inter-terminal capacitance provided between the input terminals 2b, 2a, the inter-terminal capacitance will be construed as being included in the capacitor 8 and the capacitor 14.

The resonant rectifier 5a includes rectifier diodes 26, 33, resonant coils 22, 29, resonant capacitors 23, 30, resonant coils 24, 31, and resonant capacitors 21, 28, constituting a resonant rectifier circuit in the respective inverter circuits. Resonant capacitor 25, 32 will be assumed as including the junction capacitance of the rectifier diode 26, 33. The inverter circuits are respectively connected to the output terminals 3a, 3b via output smoothing capacitors 27, 34. The resonant rectifier 5a receives an AC voltage generated in the resonant inverter 4a and converts the AC voltage into the output voltage V2, and outputs the output voltage V2 to the output terminal 3. Employing thus the resonant rectifier for connection to the resonant inverter 4a enables the overall size of the resonant power source unit to be reduced.

In the first embodiment, the third capacitor 18 is provided between the inverter circuits, and the capacitance Cf of the third capacitor 18 satisfies the following Equation (1), where Fs denotes the driving frequency of the switches 11, 15, and Lf denotes the inductance of the first coil and the second coil. Setting the third resonance frequency to equal to or higher than twice of the driving frequency Fs and lower than or equal to 3 times thereof enables the switch operating voltage of the resonant inverter to be lowered.

Figure 10:
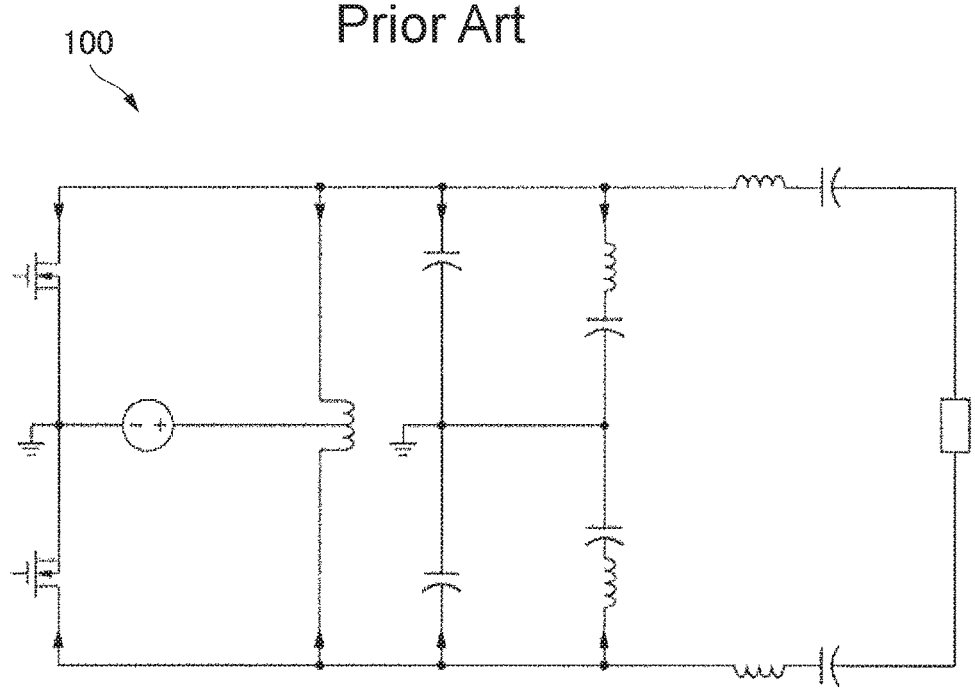
FIG. 10 is a circuit diagram of a conventional resonant inverter.
Figure 11:
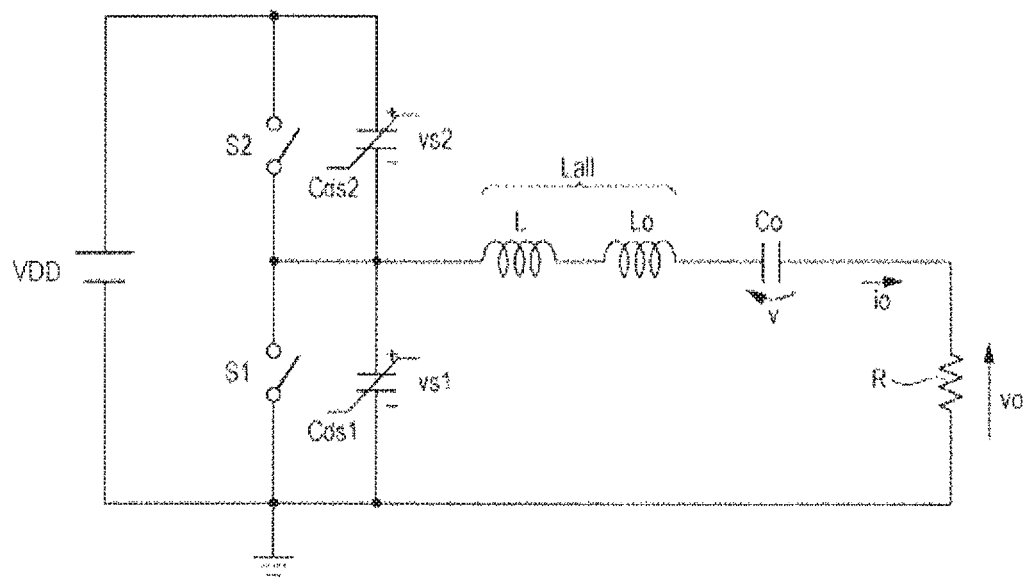
FIG. 11 is a circuit diagram of a conventional Class DE resonant inverter.

FIG. 10 is a circuit diagram of a conventional resonant inverter 100. A resonant inverter circuit shown in FIG. 11 is a Class DE inverter circuit that converts a voltage of a supply source VDD into an AC voltage by alternately turning on and off the switches S1, S2, and supplies a load R with the resonant AC voltage generated by a resonant circuit provided on the output side and including a coil La11 and capacitance Co. A first resonant capacitance Cds1 can be obtained as below. When a gate diffusion potential of a MOSFET is denoted by Vbi and the inductance and capacitance that provide an ideal resonant filter are respectively denoted by Lo and Co, an angular frequency ω can be expressed as the following equation:

$$\omega = \frac{1}{\sqrt{L_o \cdot C_o}} \qquad (2)$$

The total inductance Lall connected to the output can be expressed as the following equation, where Q denotes the sharpness of resonance:

$$L_{all} = \frac{Q \cdot R}{\omega} \quad (3)$$

When a voltage applied to the switch is denoted by vs, and vs is 0 V, the output capacitance Cjo of the switch can be expressed as the following equation:

$$C_{jo} = \frac{1}{\omega R} \cdot \frac{\frac{V_{DD}}{V_{bi}}}{4\pi \cdot \left(\sqrt{1 + \frac{V_{DD}}{V_{bi}}} - 1\right)^2} \quad (4)$$

It is known that the output capacitance Cds of the switch exhibits a non-linear transition according to the voltage vs applied to the switch. The output capacitance Cds of the switch can be expressed as the following equation, where vs denotes the voltage applied to the switch, and m denotes impurity concentration in the PN junction of the MOSFET:

$$C_{ds} = \frac{C_{jo}}{\left[\left(1 + \frac{v_s}{V_{bi}}\right)^m\right]} \quad (5)$$

In view of Equation (5), it is understood that the output capacitance of the switch decreases with the increase of the voltage, depending on the impurity concentration m. The non-linearity of Cds is not discussed herein, and therefore the following equation can be established on the assumption that m is 0, in other words that the switch capacitance does not depend on the applied voltage:

$$C_{ds} = C_{jo} \quad (6)$$

Figure 7:
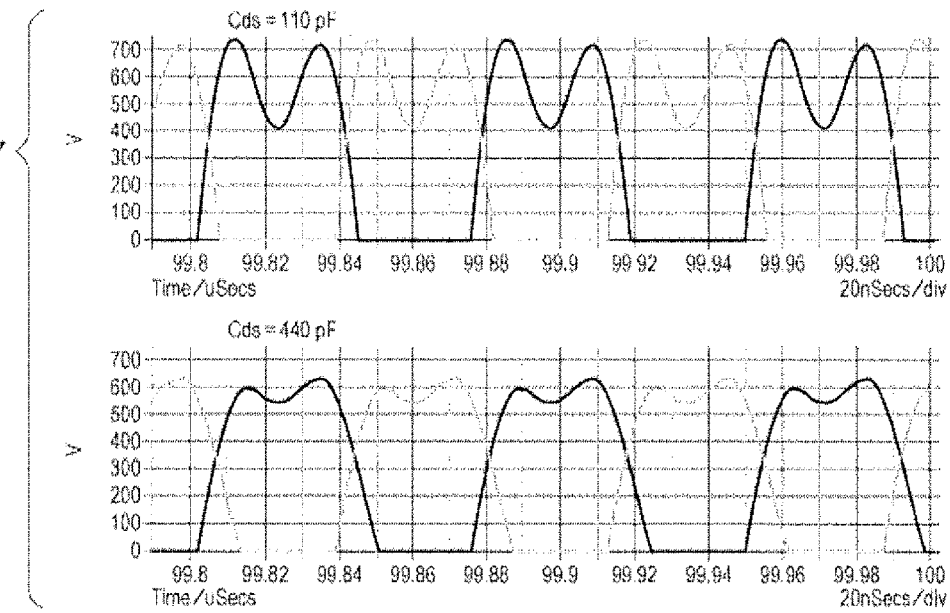
FIG. 7 is an explanatory graph showing waveforms of a conventional resonant inverter, to prove that the switch operating voltage may vary depending on the parallel capacitance of the switch, despite series resonance points and parallel resonance points being the same.
Figure 9:
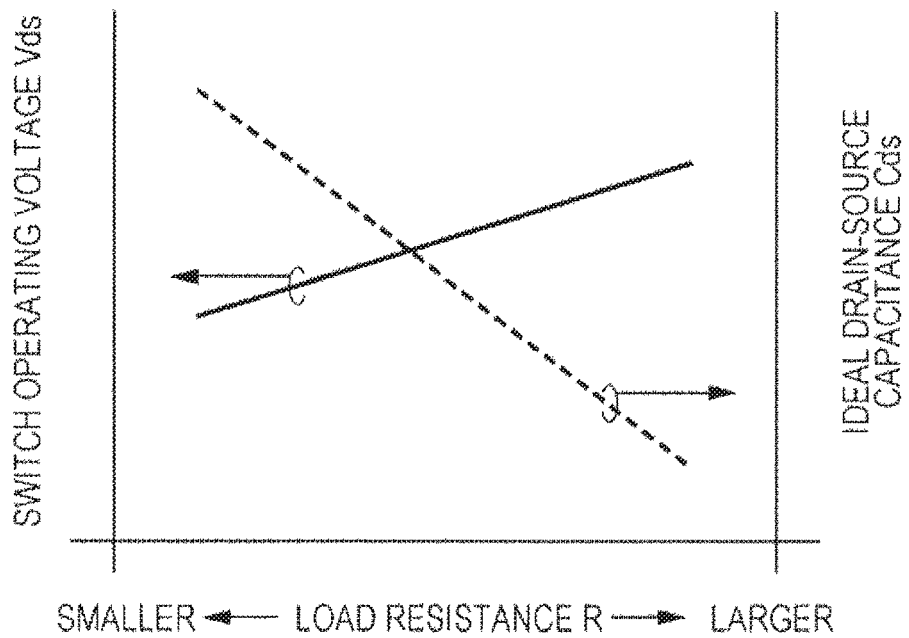
FIG. 9 is an explanatory graph showing a relationship between load resistance and ideal drain-source switch capacitance or switch operating voltage.

As described above, when the load R and the applied voltage VDD are determined on the basis of Equation (4), the switch capacitance Cds can be uniquely obtained. It is also understood that the switch capacitance Cds decreases when the load R is large (with a light load). However, as shown in FIG. 7, it is now always possible to lower the switch operating voltage with the capacitance value obtained through the foregoing equations. In this example, it is understood that the switch operating voltage can be lowered when the switch capacitance is increased to 4 times. However, as is apparent from Equation (4), when the switch capacitance Cds is increased the operating voltage is unable to be lowered unless the load resistance R is made lower (the load is made heavier). FIG. 9 schematically illustrates such a relationship.

Figure 6:
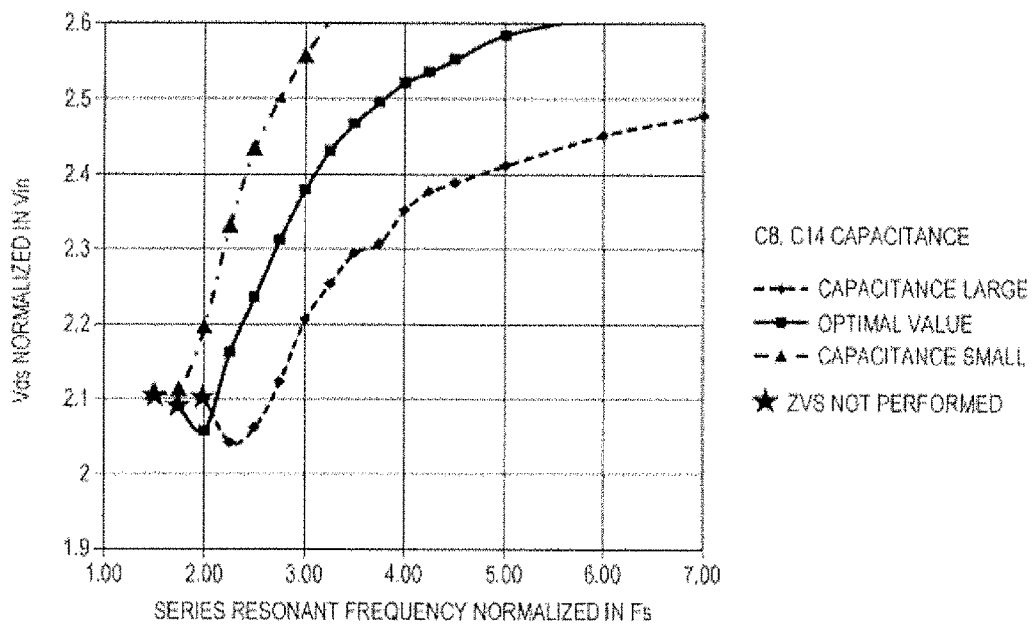
FIG. 6 is an explanatory graph showing a relationship between the resonance frequency of a third resonator and the operating voltage of a switch, in the resonant inverter according to the present invention.
Figure 8:
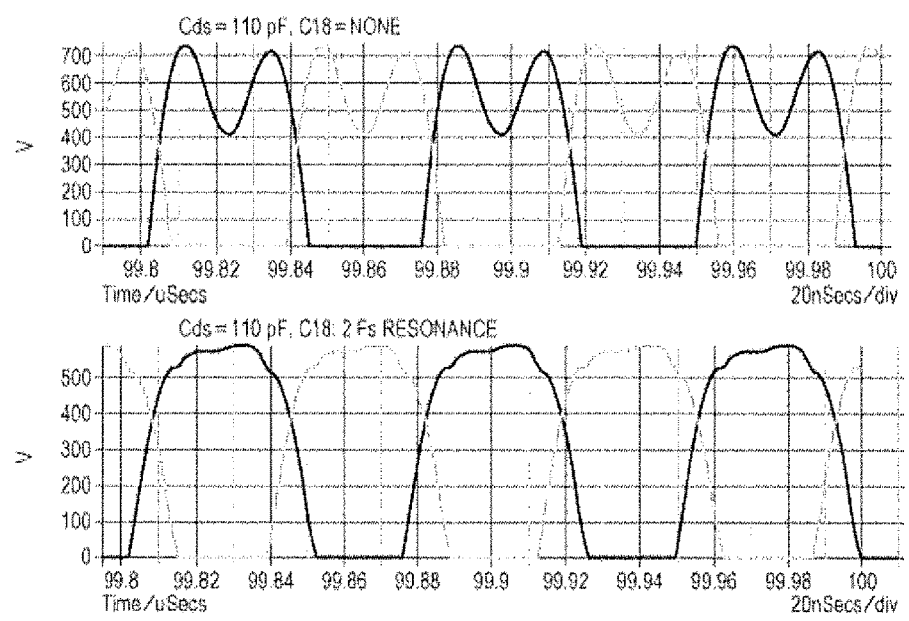
FIG. 8 is an explanatory graph showing waveforms of the resonant inverter according to the present invention, to prove that the switch operating voltage can be suppressed despite the parallel capacitance of the switch being small.

With the configuration according to the first embodiment, the switch operating voltage can be lowered with the switch capacitance Cds remaining unchanged from the constant obtained through Equation (4). More specifically, the drain waveforms of the switch 11 and the switch 15 are rectified by causing energy accumulated in the first coil 7 and the second coil 13 during the off period of the switches 11, 15 to resonate between the third capacitor 18 and the switches 11, 15. By doing so, the switch operating voltage can be lowered without affecting the switch capacitance Cds, even when the load resistance R is high (load is light). Referring now to FIG. 6, it will be assumed that the resonant capacitances of the first capacitor 8 and the second capacitor 14 are set to an optimal value. It has proved that, in FIG. 1, when the switch operating voltage is limited to 2.4 times of the input voltage V1, such switch operating voltage can be realized by setting the resonance frequency generated by the third resonator composed of the first coil 7, the second coil 13, and the third capacitor 18, to lower than or equal to 3 times of the inverter driving frequency Fs. In addition, when the resonance frequency is set to less than twice the switch is deviated from a zero-volt switching (ZVS) condition and switching loss is increased, and hence such setting has to be avoided. It has proved, as shown in FIG. 8, the stress to the switch can be reduced even when the switch capacitance Cds remains the same, by adding the third capacitor 18 and setting the resonance frequency generated by the third resonator composed of the first coil 7, the second coil 13, and the third capacitor 18 to twice of the driving frequency Fs.

As described above, with the configuration according to the first embodiment, the switch operating voltage can be easily lowered without the need for the resonant inverter circuit to adjust the first capacitor 8 and the second capacitor 14, when the load is light. FIG. 6 shows that setting the series resonance frequency generated by the third capacitor 18, the first coil 7, and the second coil 13 to equal to or higher than twice of the driving frequency Fs and lower than or equal to 3 times thereof enables a reliable resonant inverter that barely affects the life span of the switch to be realized.

Embodiment 2

Figure 2:
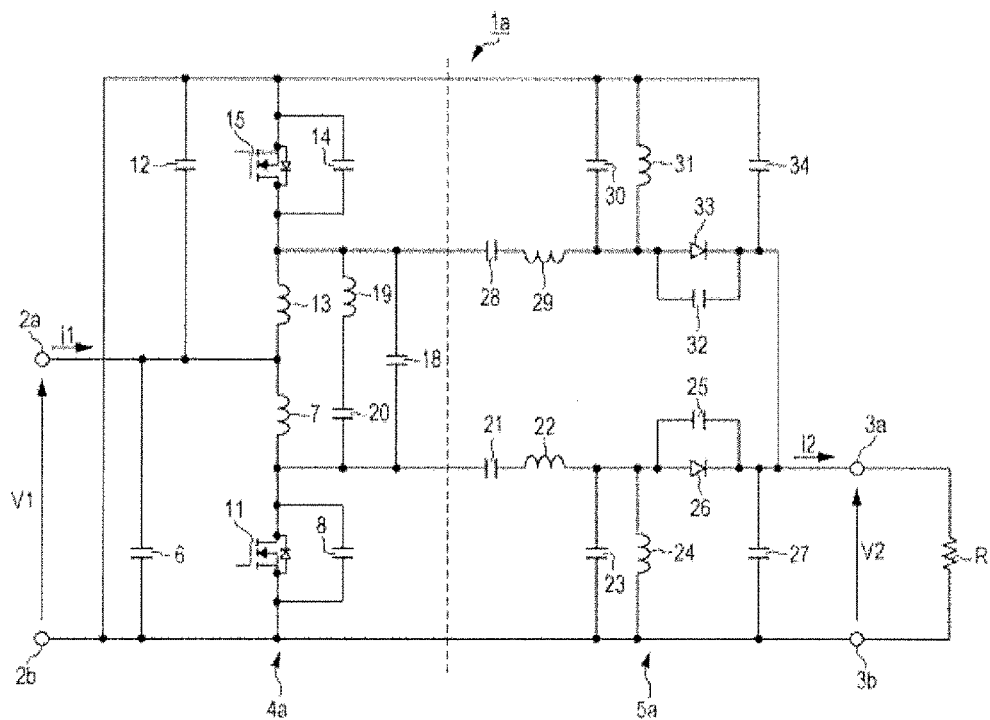
FIG. 2 is a circuit diagram of a resonant inverter and a resonant converter (resonant power source unit) according to a second embodiment of the present invention.

FIG. 2 illustrates a resonant converter according to a second embodiment of the present invention. The second embodiment is different from the first embodiment in that the resonant inverter 4a includes a fourth resonant circuit that shares a third coil 19 and a fourth capacitor 20, for the fifth and sixth resonant circuits according to the first embodiment, among the inverter circuits. The remaining portion is configured in the same way as the first embodiment. The fifth and sixth coils and the fifth and sixth capacitors, respectively constituting the fifth and sixth resonant circuits can be reduced to just one each, and therefore the number of parts to be implemented can be reduced, and fluctuation of the resonance frequency of the fourth resonant circuit between the inverter circuits can be suppressed. In the second embodiment, since the third coil 19 and the fourth capacitor 20, constituting the resonant circuit of the fourth resonant circuit, are inserted between the inverter circuits and also shared by the inverter circuits, the adjustment of the fourth resonance frequency can be performed only at one position. Therefore, the frequency fluctuation in the resonant inverter can be suppressed.

More specifically, the resonant converter according to the second embodiment includes the first switch 11 and the second switch 15 alternately turned on and off at the same frequency and with a phase difference of 180 degrees, the first capacitor 8 and the second capacitor 14 respectively connected in parallel to the first switch 11 and the second switch 15, the first coil 7 provided between the first switch 11 and the input voltage terminal 2a, the second coil 13 provided between the second switch 15 and the input voltage terminal 2a, the third coil 19 and the fourth capacitor 20 connected in series to each other and also connected in parallel to the series circuit of the first coil 7 and the second coil 13, and the third capacitor 18 connected in parallel to the series circuit of the first coil 7 and the second coil 13. The first coil 7 and the first capacitor 8 constitute the first resonant circuit, the second coil 13 and the second capacitor 14 constitute the second resonant circuit, the third coil 19 and the fourth capacitor 20 constitute the fourth resonant circuit, and the first coil 7, the second coil 13, and the third capacitor 18 constitute the third resonant circuit.

Accordingly, the fifth and sixth resonant circuits of the respective inverter circuits can be replaced with a single circuit, namely the fourth resonant circuit, and hence the number of coil elements and capacitors constituting the resonant circuit can be reduced. Therefore, the size and manufacturing cost of the apparatus can be reduced, and fluctuation of the resonance frequency in the resonant inverter can be suppressed. Consequently, the resonant inverter capable of reducing the voltage stress to the switch and minimizing unfavorable impact on the life span of the switch can be obtained. In addition, the switch operating voltage can be effectively lowered by setting the resonance frequency of the third resonant circuit to equal to or higher than twice of the driving frequency and lower than or equal to 3 times thereof.

Embodiment 3

Figure 3:
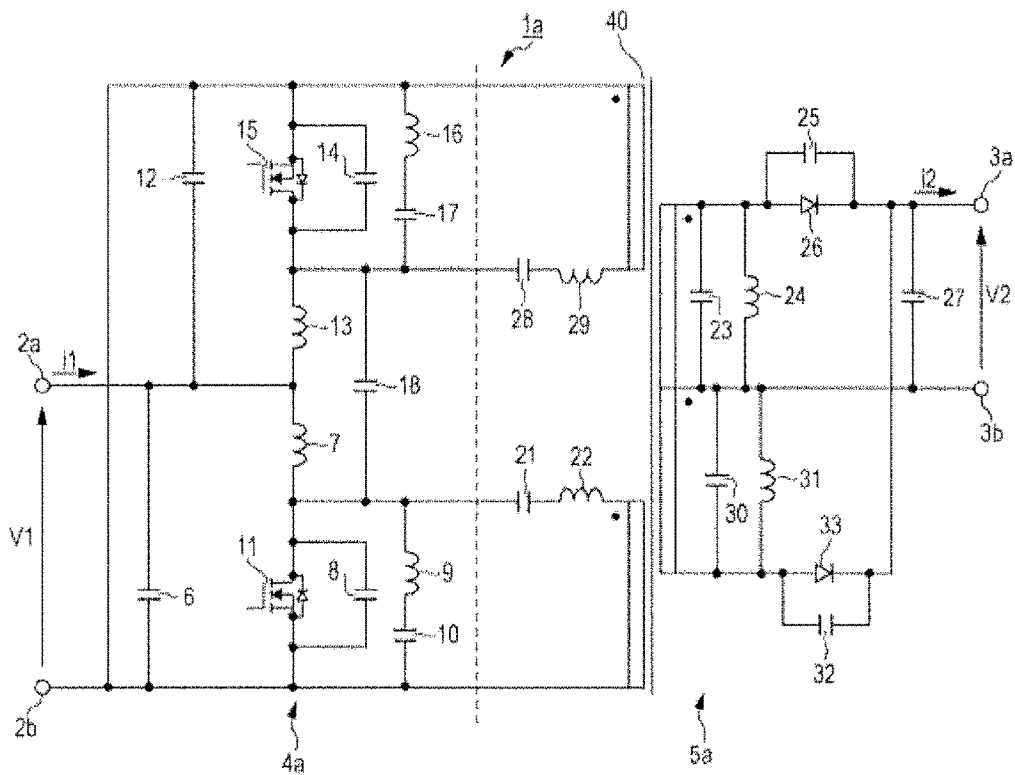
FIG. 3 is a circuit diagram of a resonant inverter and a resonant converter (resonant power source unit) according to a third embodiment of the present invention.

FIG. 3 illustrates a resonant converter according to a third embodiment of the present invention. The third embodiment is different from the first embodiment in constituting an isolated inverter, and further including a transformer 40 on the side of the resonant rectifier 5a. The remaining portion is configured in the same way as the first embodiment.

The resonant rectifier 5a includes the series circuit of the resonant capacitor 21 and the resonant coil 22 constituting the resonant rectifier circuit, provided between the primary side first winding of the transformer 40 and the drain of the first switch 11. The resonant rectifier 5a also includes the series circuit of the resonant capacitor 28 and the resonant coil 29 constituting the resonant rectifier circuit, provided between the primary side second winding of the transformer 40 and the drain of the second switch 15. Thus, a plurality of resonant rectifier circuits are provided between the transformer 40 and the switches 11, 15.

With the mentioned configuration, the isolated resonant inverter can be obtained with the resonance conditions maintained unchanged, despite the transformer 40 being incorporated.

Embodiment 4

Figure 4:
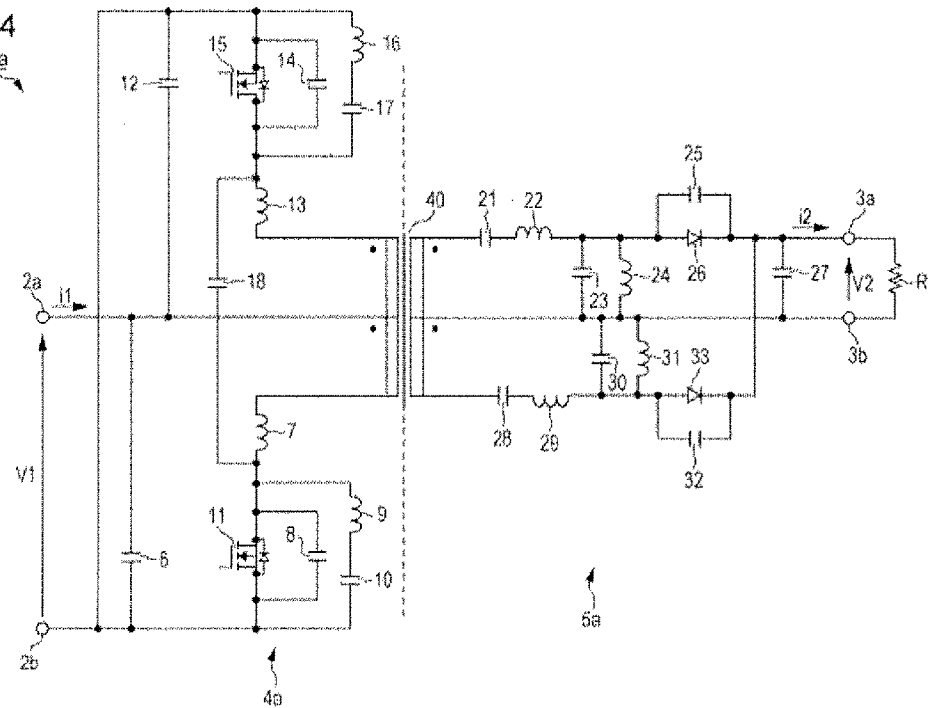
FIG. 4 is a circuit diagram of a resonant inverter and a resonant converter (resonant power source unit) according to a fourth embodiment of the present invention.

FIG. 4 illustrates a resonant converter according to a fourth embodiment of the present invention. The fourth embodiment is different from the first embodiment in including the isolation transformer 40 between the first coil 7 and the second coil 13 referred to in the first embodiment, and in that a center tap provided between the primary side first winding and the primary side second winding of the isolation transformer 40 is connected to the input terminal 2a. In addition, the resonant rectifier 5a is added to the secondary side of the isolation transformer 40. The remaining portion is configured in the same way as the first embodiment.

The first coil 7 has one end connected to the third capacitor 18, and the other end connected to one end of the primary side first winding of the transformer 40. The other end of the third capacitor 18 is connected to one end of the second coil 13. The other end of the second coil is connected to one end of the primary side second winding of the transformer 40. The center tap between the first winding and the second winding of the transformer 40 is connected to the first input terminal 2a. Further, the first coil 7, the second coil 13, the series connection of first winding and the second winding on the primary side of the transformer 40, and the third capacitor 18 constitute a single resonant circuit, namely a seventh resonant circuit.

With the mentioned configuration, the isolated resonant inverter can be obtained with the resonance conditions maintained unchanged, even when the center tap provided between the first winding and the second winding of the transformer 40 is connected to the input terminal to which the input voltage is applied.

Embodiment 5

Figure 5:
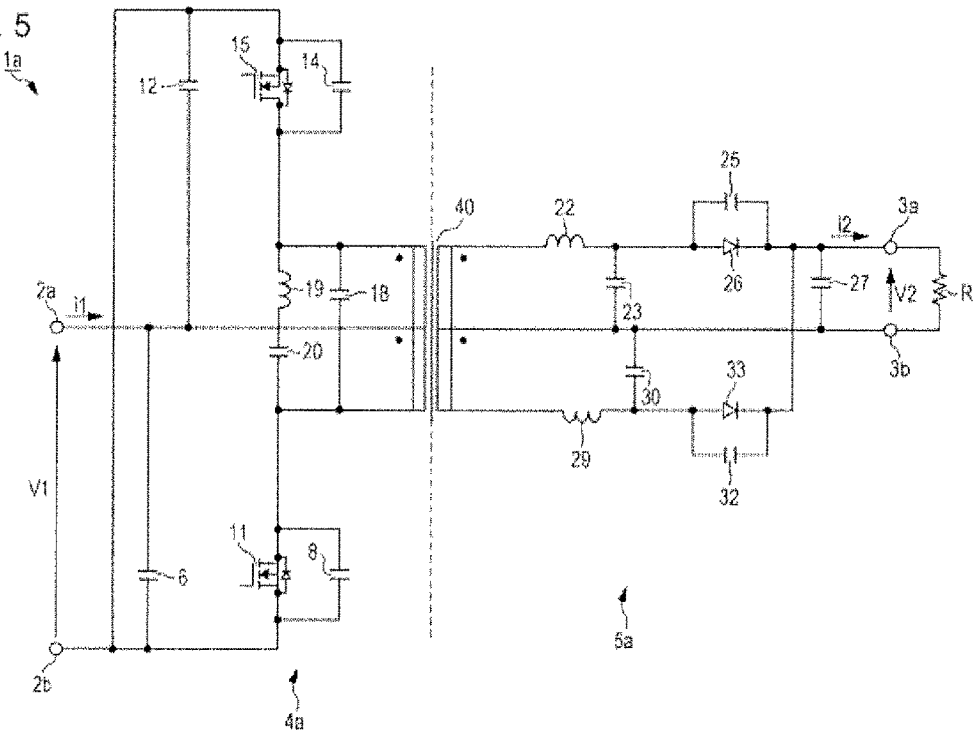
FIG. 5 is a circuit diagram of a resonant inverter and a resonant converter (resonant power source unit) according to a fifth embodiment of the present invention.

FIG. 5 illustrates a resonant converter according to a fifth embodiment of the present invention. The fifth embodiment is different from the fourth embodiment in that the first coil 7 and the second coil 13 referred to in the fourth embodiment are set up as leakage inductance of the first winding and the second winding of the transformer 40. The remaining portion is configured in the same way as the fourth embodiment. The leakage inductance of the transformer 40 serves as the first coil 7 and the second coil 13.

The resonant converter shown in FIG. 5 includes the first switch 11 and the second switch 15 alternately turned on and off at the same frequency and with a phase difference of 180 degrees, the first capacitor 8 and the second capacitor 14 respectively connected in parallel to the first switch 11 and the second switch 15, the primary side first winding containing a first coil component in the transformer 40 provided between the first switch 11 and the input voltage terminal 2a, the primary side second winding containing a second coil component in the transformer 40 provided between the second switch 15 and the input voltage terminal 2a, the third coil 19 and the fourth capacitor 20 connected in series to each other, and the third capacitor 18 connected in parallel to the series connection of the first winding and the second winding on the primary side of the transformer 40. The first capacitor 8 and the leakage inductance of the primary side first winding of the transformer 40 constitute a ninth resonant circuit, the second capacitor 14 and the leakage inductance of the primary side second winding of the transformer 40 constitute a tenth resonant circuit, the third coil 19 and the fourth capacitor 20 constitute the fourth resonant circuit, and the leakage inductance of the first winding and the second winding on the primary side of the transformer 40 and the third capacitor 18 constitute an eighth resonant circuit. The eighth resonant circuit is functionally equivalent to the third resonant circuit. The ninth and tenth resonant circuits are functionally equivalent to the first resonant circuit and the second resonant circuit, respectively.

The mentioned configuration allows the number of coils constituting the first resonant circuit, the second resonant circuit, and the third resonant circuit to be reduced, thereby contributing to the reduction in size and manufacturing cost of the apparatus. In addition, since the fluctuation of the third resonance frequency is suppressed the unevenness of the waveform among the inverter circuits can be minimized, and therefore the resonant inverter capable of reducing the voltage stress to the switch and minimizing unfavorable impact on the life span of the switch can be obtained. In addition, the switch operating voltage can be effectively lowered by setting the resonance frequency of the eighth resonant circuit to equal to or higher than twice of the driving frequency Fs and lower than or equal to 3 times thereof.

Embodiment 6

In all the resonant inverters shown in FIG. 1 to FIG. 5, an optimal operating point can be obtained at a certain unique point of the load resistance, when the capacitance of the first capacitor 8 and the second capacitor 14 is calculated from the load resistance R. When the load resistance R is varied, the capacitance of the first capacitor 8 and the second capacitor 14 for determining the optimal operating point should also be varied. Accordingly, Cds (herein assumed to be equal to Cjo) corresponding to R in the variable range is obtained through Equation (4), and a variable capacitor that satisfies the range is selected as the first capacitor 8 and the second capacitor 14. The variable capacitor may be one that mechanically varies the distance between the electrodes thereby varying the capacitance, or a trimmer capacitor that mechanically varies the area of the opposing electrodes. Regarding the lowest point of the switch operating voltage provided by the third resonant circuit, when the capacitance of the first capacitor 8 and the second capacitor 14 is set variable, the optimal value of the third resonant circuit that provides the lowest switch operating voltage also varies. Regarding the resonance point that makes the drain-source voltage lowest, the resonance frequency of the third resonant circuit becomes lower with a decrease of the first and second resonant capacitance, and the resonance frequency of the third resonant circuit becomes higher with an increase of the first and second resonant capacitance. Therefore, the switch operating voltage can be lowered by varying the third capacitor Cf so as to follow up the variation of the first capacitor 8 and the second capacitor 14. More specifically, when the load resistance R is decreased and the first capacitor 8 and the second capacitor 14 are made larger, the capacitance Cf of the third capacitor 18 is reduced in order to increase the resonance frequency of the third resonant circuit, and when the load resistance R is increased and the first capacitor 8 and the second capacitor 14 are made smaller, the capacitance Cf of the third capacitor 18 is increased in order to reduce the resonance frequency of the third resonant circuit. Referring to FIG. 6, when the main switch operating voltage is to be set to 2.2 times of the input voltage by varying the load resistance R, the switch operating voltage can be maintained at a constant level by setting the resonance frequency of the third resonant circuit to 2.3 times when the optimal value is obtained, and setting the resonance frequency to twice at a lower limit of the load and to 3 times at an upper limit of the load.

Although the resonant inverter and the resonant power source unit according to some embodiments of the present invention have been described above, various modification may be made without limitation to the foregoing embodiments.

For example, although the foregoing embodiments represent the case where the first switch 11 and the second switch 15 are constituted of a field effect transistor (FET), the switches may be of a different type, such as a bipolar transistor.

In addition, although the foregoing embodiments represent the case where the resonant inverter is a buck inverter, the resonant inverter may be a boost inverter.

What is claimed is:

1. A resonant inverter comprising:
   a first switch and a second switch alternately turned on and off;
   a first inverter including the first switch and a first resonant circuit including a first coil and a first capacitor; and
   a second inverter including the second switch and a second resonant circuit including a second coil and a second capacitor,
   wherein the first coil, the second coil, and a third capacitor constitute a third resonant circuit.

2. The resonant inverter according to claim 1,
   wherein the first capacitor is connected in parallel to the first switch,
   the second capacitor is connected in parallel to the second switch,
   the first coil is provided between the first switch and a first input terminal,
   the second coil is provided between the second switch and the first input terminal, and
   the third capacitor is provided between the first switch and the second switch,
   and connected in parallel to the first coil and the second coil connected in series to each other.

3. The resonant inverter according to claim 2, further comprising a fourth capacitor and a third coil provided between the first switch and the second switch, and constituting a fourth resonant circuit.

4. The resonant inverter according to claim 2, further comprising a fifth resonant circuit including a fifth coil provided parallel to the first switch and a fifth capacitor, the fifth coil and the fifth capacitor being connected in series, and a sixth resonant circuit including a sixth coil provided parallel to the second switch and a sixth capacitor, the sixth coil and the sixth capacitor being connected in series.

5. The resonant inverter according to claim 1, further comprising a fourth capacitor and a third coil provided between the first switch and the second switch, and constituting a fourth resonant circuit.

6. The resonant inverter according to claim 1, further comprising a fifth resonant circuit including a fifth coil provided parallel to the first switch and a fifth capacitor, the fifth coil and the fifth capacitor being connected in series, and a sixth resonant circuit including a sixth coil provided parallel to the second switch and a sixth capacitor, the sixth coil and the sixth capacitor being connected in series.

7. The resonant inverter according to claim 1,
   wherein a capacitance Cf of the third capacitor satisfies an equation (1), where Lf denotes inductance of the first coil and the second coil, and Fs denotes a driving frequency of the first and second switches:

$$\frac{1}{4\pi^2 2L_f(2F_s)^2} \leq C_f \leq \frac{1}{4\pi^2 2L_f(3F_s)^2}. \quad (1)$$

8. The resonant inverter according to claim 1,
   wherein each of the first capacitor, the second capacitor, and the third capacitor is a variable capacitor.

9. A resonant power source unit comprising:
   the resonant inverter according to claim 1; and
   a resonant rectifier connected to the resonant inverter.

10. A resonant inverter comprising:
    a first switch and a second switch alternately turned on and off, and a transformer including a first winding and a second winding on a primary side;

a first inverter including the first switch and a first resonant circuit including a first coil and a first capacitor; and a second inverter including the second switch and a second resonant circuit including a second coil and a second capacitor, wherein the first coil, the second coil, and a third capacitor constitute a third resonant circuit.

11. The resonant inverter according to claim 10, wherein the first capacitor is connected in parallel to the first switch, the second capacitor is connected in parallel to the second switch, the first coil is connected to the first switch and one end of the first winding of the transformer, the second coil is connected to the second switch and one end of the second winding of the transformer, and the third capacitor is provided between the first switch and the second switch.

12. The resonant inverter according to claim 11, further comprising a fourth capacitor and a third coil provided between the first switch and the second switch and constituting a fourth resonant circuit.

13. The resonant inverter according to claim 11, further comprising a fifth resonant circuit including a fifth coil provided parallel to the first switch and a fifth capacitor, the fifth coil and the fifth capacitor being connected in series, and a sixth resonant circuit including a sixth coil provided parallel to the second switch and a sixth capacitor, the sixth coil and the sixth capacitor being connected in series.

14. The resonant inverter according to claim 10, further comprising a fourth capacitor and a third coil provided between the first switch and the second switch and constituting a fourth resonant circuit.

15. The resonant inverter according to claim 10, further comprising a fifth resonant circuit including a fifth coil provided parallel to the first switch and a fifth capacitor, the fifth coil and the fifth capacitor being connected in series, and a sixth resonant circuit including a sixth coil provided parallel to the second switch and a sixth capacitor, the sixth coil and the sixth capacitor being connected in series.

16. The resonant inverter according to claim 10, further comprising a seventh resonant circuit including the first coil, the second coil, the first winding of the transformer, the second winding of the transformer, and the third capacitor.

17. The resonant inverter according to claim 10, wherein the first coil and the second coil is constituted of leakage inductance of the transformer.

18. The resonant inverter according to claim 10, wherein a center tap provided between the first winding and the second winding of the transformer is connected to an input terminal to which an input voltage is applied.

19. A resonant power source unit comprising:

the resonant inverter according to claim 10; and a resonant rectifier connected to the resonant inverter, wherein the resonant rectifier includes a plurality of resonant rectifier circuits, and the resonant rectifier circuits are respectively provided between the first switch and a first winding of the transformer and between the second switch and a second winding of the transformer.

20. The resonant inverter according to claim 10, wherein a capacitance Cf of the third capacitor satisfies an equation (1), where Lf denotes inductance of the first coil and the second coil, and Fs denotes a driving frequency of the first and second switches:

$$\frac{1}{4\pi^2 2L_f(2F_s)^2} \le C_f \le \frac{1}{4\pi^2 2L_f(3F_s)^2}. \qquad (1)$$

21. The resonant inverter according to claim 10, wherein each of the first capacitor, the second capacitor, and the third capacitor is a variable capacitor.

22. A resonant power source unit comprising:

the resonant inverter according to claim 10; and a resonant rectifier connected to the resonant inverter.

* * * * *